United States Patent [19]
Bordignon et al.

[11] Patent Number: 5,381,258
[45] Date of Patent: Jan. 10, 1995

[54] LASER PROJECTOR FOR PROJECTING AN IMAGE ONTO A CURVILINEAR SURFACE

[75] Inventors: Richard M. Bordignon, Waterloo; Kurt Rueb, Kitchener; John Wieczorek, Waterloo, all of Canada

[73] Assignee: Virtek Vision Intelligence Robotics Technologies Corporation, Waterloo, Canada

[21] Appl. No.: 212,665

[22] Filed: Mar. 14, 1994

[51] Int. Cl.⁶ .............................................. G02B 26/08
[52] U.S. Cl. ................................. 359/202; 359/201;
359/221; 359/196; 372/24; 348/202; 348/203; 348/207; 348/294
[58] Field of Search ............... 359/201, 202, 196, 221; 358/205, 206, 209, 213.11; 372/24

[56] References Cited

U.S. PATENT DOCUMENTS

| | | | |
|---|---|---|---|
| 4,575,625 | 3/1986 | Knowles | 372/24 |
| 4,797,749 | 1/1989 | Paulsen | 358/302 |
| 4,816,920 | 3/1989 | Paulsen | 358/285 |
| 5,048,904 | 9/1991 | Montagu | 359/202 |
| 5,146,463 | 9/1992 | Rando | 372/24 |
| 5,150,249 | 9/1992 | Montagu | 359/202 |
| 5,237,444 | 8/1993 | Schermer | 359/202 |
| 5,309,273 | 5/1994 | Mori et al. | 359/202 |

FOREIGN PATENT DOCUMENTS

| | | |
|---|---|---|
| 2096147 | 12/1993 | Canada . |
| 1326711 | 2/1994 | Canada . |
| 1327850 | 3/1994 | Canada . |

OTHER PUBLICATIONS

Rueb, K., "Hypothesis Refinement for 3D Scene Interpretation", PhD Thesis, University of Waterloo, 1990, pp. 25-55, 77-81, 87-92.

*Primary Examiner*—Georgia Y. Epps
*Attorney, Agent, or Firm*—Jeffrey T. Imai; D. Doak Horne; Arne I. Fors

[57] ABSTRACT

A laser projection system for projecting an image onto a surface comprises a laser projector operably connectable to a computer. The computer controls the operation of the system. The laser projector comprises a laser beam source for generating a laser light beam, a collimator comprising a focusing leans for focusing the laser light beam to a focal point, a collimating lens for collimating the laser light beam beyond the focal point and a wedge-shaped lens having an apertured interposed between the focusing lens and collimating lens. The aperture has a size for passing the laser light beam therethrough. Two scanners direct the light beam about a light path. A photo sensor receives light refracted by the wedge-shaped lens and generates a feedback signal. A plurality of target reflectors, each having a retroreflective material for retroreflecting light back to its source. The laser light beam is projectable in a predetermined pattern and if the laser light beam is retroreflected back to the laser light source, the retroreflected laser light beam is refracted by the wedge-shaped lens towards the photo sensor for generating a feedback signal for the computer. The plurality of target reflectors comprises a plurality of mountable targets for removably mounting on the surface. Upon striking the mountable targets with the laser beam, the photo sensor generates a plurality of feedback signals for establishing spatial coordinates of the mountable targets. The plurality of target reflectors further comprises a moveable target for inserting in the light path of the laser beam while projecting the image. Upon striking the moveable target with the laser beam, the photo sensor generates a feedback signal for limiting the area of projection of the image.

9 Claims, 9 Drawing Sheets

LASER PROJECTOR FOR PROJECTING AN IMAGE ONTO A CURVILINEAR SURFACE

FIELD OF INVENTION

This invention relates to a laser projector for projecting an image onto a curvilinear surface. In particular, this invention relates to laser projector for assisting in the hand lay-up of composite parts by projecting a thin laser line over a target area with a high degree of accuracy over any tool, flat or contoured.

BACKGROUND OF INVENTION

Computer aided design (CAD) is widely used in the design and manufacture of complex tools. Although a CAD system can simplify the design process, the patterns established by the CAD system must still be projected onto the tool surface for the manufacture of the tool.

In the past, MYLAR sheets with a pattern imprinted thereon have been used to apply the pattern to the tool. This method is satisfactory for planar surfaces or surfaces having a curve in only one dimension. With more complicated surfaces, the MYLAR sheet will not sit flat and therefore the accuracy of the applied pattern is greatly diminished.

Laser scanners such as those described in U.S. Pat. No. 5,237,444 have been used to project a pattern onto a cylindrical object surface. A focused laser beam is deflected by the use of two orthogonally placed scanners causing the laser beam to follow a varying optical path to various object points. The scanners each pivotally rotate a mirror which will direct the laser beam to any point on the object's surface. This type of scanner can accept CAD data. By controlling the axis of rotation of the two mirrors, the scanners can project a vary accurate image onto the object's surface. However, the scanners must be very precisely located relative to the object in order to precisely locate the projected image. Considerable time is therefore necessary in order to precisely calibrate the positioning of the laser head relative to the object.

In still other types of scanners as disclosed in U.S. Pat. Nos. 4,797,747, 4,816,920, 5,048,904 and 5,150,249, scanning systems project an image onto a two dimensional surface. These scanners are used for projecting images for laser printers or reading an image from a surface for facsimile image transmission devices. In this type of apparatus, a beam splitter is used to direct a portion of the laser beam to a photo detector or sensor that monitors the beam intensity and provides a corresponding feedback signal to a logic controller or host computer to maintain a constant beam intensity. By using a beam splitter, the laser beam is attenuated resulting in a loss of power which can be as high as 50%.

Still other optical scanners utilize a conventional laser projector with optical sensors mounted on the object itself. When the laser beam contacts the optical sensor, a corresponding signal is generated and sent back to a logic controller. However, this system requires that the optical sensors be wired directly to the logic controller. In many heavy industrial situations, a series of wires is unacceptable for implementation.

The principal disadvantage of the prior art devices is that each of the devices do not include any effective feedback means for generating a feedback signal without attenuating the laser beam.

Further, accurate projection with a precision of thousandths of an inch from a distance of many feet based on absolute positioning of the laser projector and tool requires elaborate and expensive fixtures, cumbersome operating procedures and would be affected by many possible sources of error.

SUMMARY OF THE INVENTION

The disadvantages of the prior art may be overcome by providing a laser projector which not only projects a laser beam onto a curvilinear surface but also receives light reflected from the object's surface for generating a feedback signal without attenuating the laser beam strength. The feedback signal can be used for a variety of purposes, including defining the location of the object relative to the laser projector and for signalling the projector that only a particular area of the pattern is required to be repeated.

It is desirable to calculate the relative position of the tool to the scanner based on four or more retroreflective target reflectors positioned on the layout tool. Because the target reflector locations are machined into the actual tool, high precision can be maintained and no precise positioning of the tool itself is necessary.

According to one aspect of the invention, there is provided a laser projection system for projecting an image onto a surface comprises a laser projector operably connectable to a computer. The computer controls the operation of the system. The laser projector comprises a laser beam source for generating a laser light beam, a collimator comprising a focusing lens for focusing the laser light beam to a focal point, a collimating lens for collimating the laser light beam beyond the focal point and a wedge-shaped lens having an aperture interposed between the focusing lens and collimating lens. The aperture has a size for passing the laser light beam therethrough. Two scanners direct the light beam about a light path. A photo sensor receives light refracted by the wedge-shaped lens and generates a feedback signal. A plurality of target reflectors, each having a retroreflective material for retroreflecting light back to its source. The laser light beam is projectable in a predetermined pattern and if the laser light beam is retroreflected back to the laser light source, the retroreflected laser light beam is refracted by the wedge-shaped lens towards the photo sensor for generating a feedback signal for the computer.

In another aspect of the invention, there is provided a plurality of mountable targets for removably mounting on the surface and upon striking the mountable targets with the laser beam, the photo sensor generates a plurality of feedback signals for establishing spatial coordinates of the mountable targets.

In another aspect of the invention, there is provided a moveable target for inserting in the light path of the laser beam while projecting the image and upon striking the moveable target with the laser beam, the photo sensor generates a feedback signal for limiting the area of projection of the image.

In yet another aspect of the invention, there is provided a method of producing a feedback signal. The method comprises the steps of:

generating a laser light beam from a laser light beam source, collimating the laser light beam, directing the laser light beam towards an object, reflecting the laser light beam onto a return path towards the laser light source, refracting the laser light beam while on said return path towards a photo sensor, the photo sensor responsive to the laser light beam for generating a feedback signal.

In still yet another aspect of the invention there is provided a method of collimating the laser light through an aperture of a wedge-shaped lens and the wedge-shaped lens refracting the laser light beam.

In still yet another aspect of the invention, there is provided a method wherein the wedge-shaped lens has a face angle of between 5° and 45°.

DESCRIPTION OF THE DRAWINGS

In drawings which illustrate the preferred embodiment of the invention.

DETAILED DESCRIPTION OF THE INVENTION

Figure 1:
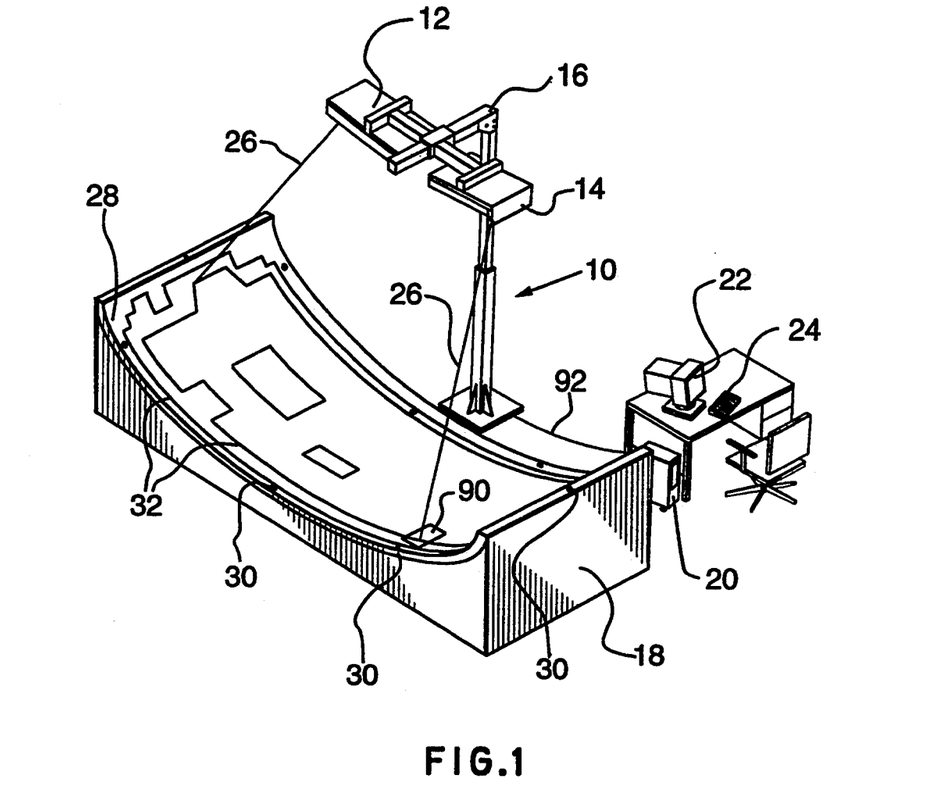
FIG. 1 is a perspective view of the present invention projecting an image onto a layout tool surface.

The present invention is illustrated in FIG. 1 as 10. The system comprises laser projectors 12 and 14 mounted on a support structure 16 which suspends the laser projectors 12 and 14 over top of layout tool 18. Laser projectors 12 and 14 are serially connected to each other by cables and connected to host computer 20 which includes a monitor 22 and keyboard 24. Laser projectors 12 and 14 each emit a laser beam 26 onto surface 28 of layout tool 18. Surface 28 can be any contour, including planar and curvilinear. Spaced about the outer perimeter of surface 28 are target reflectors 30.

In response to reading a CAD file produced by any known and commercially available CAD system, laser projectors 12 and 14 will project pattern 32 defined by the laser path onto surface 28.

Figure 2:
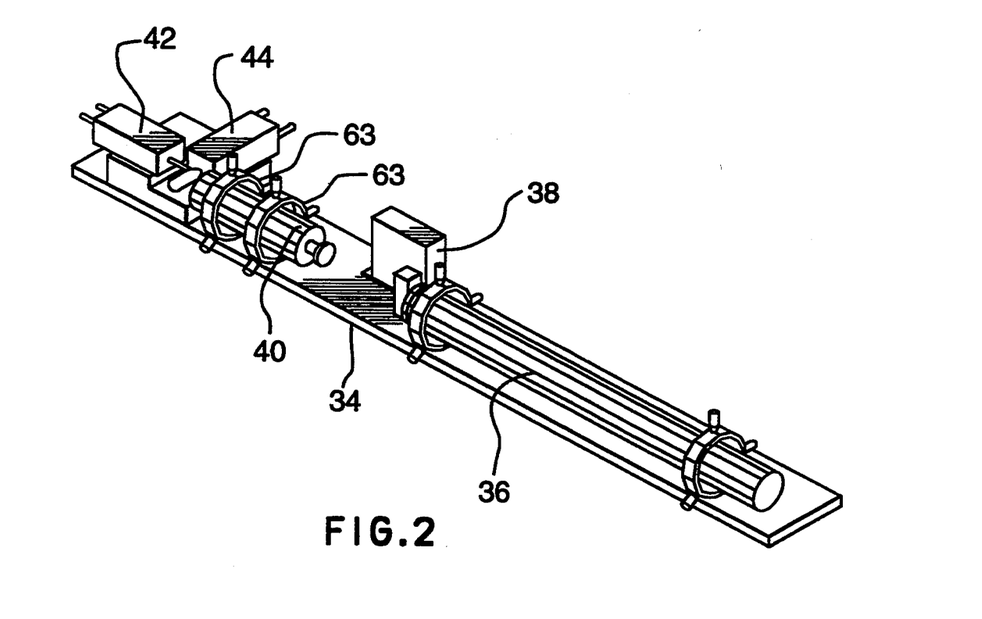
FIG. 2 is a perspective view in an inverted condition of the laser projector of the invention of FIG. 1 with the housing removed.

Referring to FIG. 2, the laser projector is illustrated. The projector comprises an elongated base plate 34. At one end of the base plate is a laser light source 36 having a laser intensity controller 38 electrically connected to the laser 36 for controlling the intensity of the laser light source 36. Preferably laser light source is a helium-neon laser.

In alignment with the laser beam projected by laser 36 is a focus and sensor detection device 40. Focus and sensor detection device 40 focuses the laser beam for projecting light beam to scanners 42 and 44. Scanners 42 and 44 are orthagonally mounted, with scanner 42 substantially in alignment with the laser beam and scanner 44 mounted orthogonally thereto. Scanners 42 and 44 are commercially available from Cambridge Technologies Incorporated.

Figure 3:
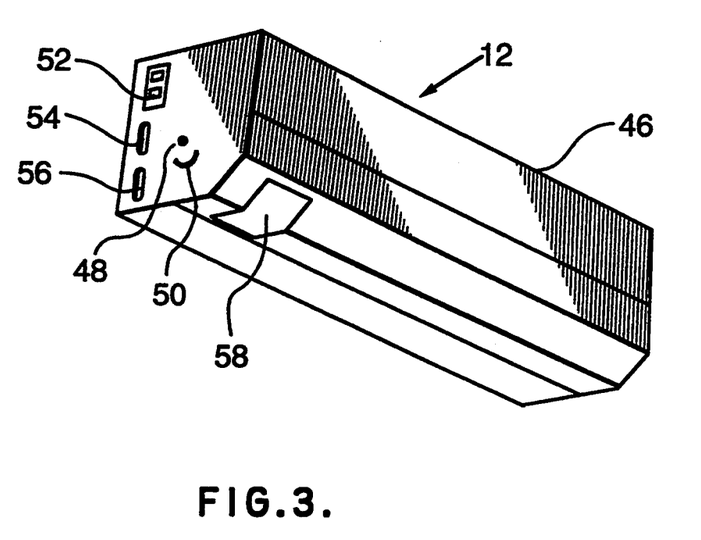
FIG. 3 is a perspective view the laser projector of the invention of FIG. 1 with housing.

Referring to FIG. 3, the projector with housing 46 is illustrated. Mounting plate 34 is mounted within housing 46 and between opposite ends thereof by screws 48 which project into the ends of mounting plate 34. A second screw having a slotted opening in the ends of housing 46 is used to provide some adjustment for the projection of the laser beam. The housing is also provided with an on/off switch and power connector 52. Cable jack 54 is also mounted on the end of housing 46 for receiving a standard printer cable which operably connects the projector 12 to host computer 20. A second jack is also provided for serially connecting laser projector 12 with laser projector 14.

Housing 46 also has a window 58 for allowing the laser beam to exit the housing.

Figure 4:
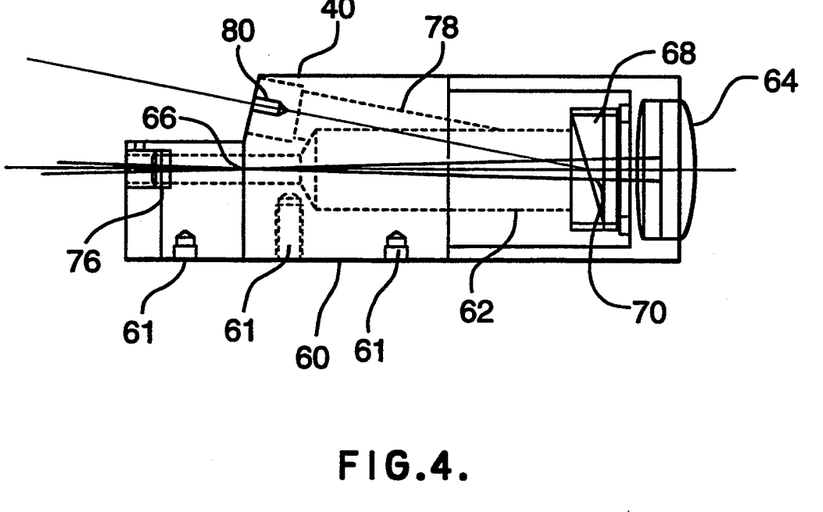
FIG. 4 is a side elevational view of the focus and sensor detection device of the invention of FIG. 1.

Referring now to FIG. 4, the focus and sensor detection device 40 is illustrated in greater detail. Device 40 comprises a housing 60 having a longitudinal central stepped bore extending therethrough. Lens 64 is mounted at the output end of bore 62. Lens 64 is a collimating lens designed to receive a focused laser beam and collimate the beam.

Adjacent lens 64 is a wedge-shaped lens 68 which has a central bore 70 extending therethrough. Lens 68 has an angled face 72 and an input face 74. The angled face 72 relative to face 74 has a face angle of preferably 10°. Any face angle from about 5° up to about 45° may be used. Lens 68 is preferably made from glass with the angled face 72 and input face 74 being polished.

At the input end of stepped bore 62 is a focusing lens 76. Lens 76 focuses the laser light beam to a focal point 66.

Angled away from stepped bore 62 is channel 78 which has a angle corresponding to the face angle wedge-shaped lens 68. At the end of channel 78, is photo sensor 80. Photo sensor 80 is electrically connected to the host computer 20 and generates a signal when the sensor 80 receives a light beam. The location of sensor 80 is on a radial arm having the same radial length as the distance between lens 64 and the focal point 66.

Figure 5:
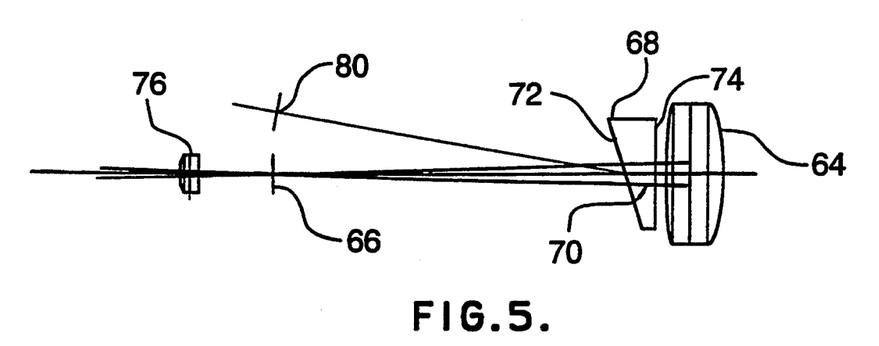
FIG. 5 is a schematic view of the lens arrangement of the focus and sensor detection device of FIG. 4.

Housing 60 may be affixed to the base plate 34 be any suitable means. In FIG. 5, the housing is provided with a plurality of tapped bores 61 which receive bolts to affix the housing 60 to the base plate 34. In FIG. 2, brackets 63 which have bolts for cradling the housing 60 are used. Any method may be used, provided there is some method of accurately aligning the lenses 64 and 76 with the laser beam.

Referring to FIG. 5, the optics of the system is more clearly illustrated. Lens 76 receives a light beam from the laser 36. The lens 76 focuses the light beam to a focal point 66. Beyond the focal point is lens 64 which redirects the light back into a parallel light beam. The size of aperture 70 of wedge-shaped lens 68 is such that the laser beam after it passes through lens 76 it does not pass through the lens portion of wedge-shaped lens but rather through the central aperture 70. In this way, the originating laser light beam is not attenuated. The laser light beam will pass through lens 64 to the mirrors mounted on scanners 42 and 44, project onto the surface 28 of layout tool 18, be reflected off target reflectors 30 directly back to the focus and detection device 40 on the same path. As the beam travels and is reflected off the retroreflectors, the beam increases in width or blobs out as it returns. The laser beam will pass back through lens 64 towards wedge-shaped lens 68. Since the beam is now greater in diameter than the diameter of aperture 70 part of the beam will now be refracted towards photo sensor 80. Upon receiving light, sensor 80 will generate a feedback signal which is sent to host computer 20.

Figure 6:
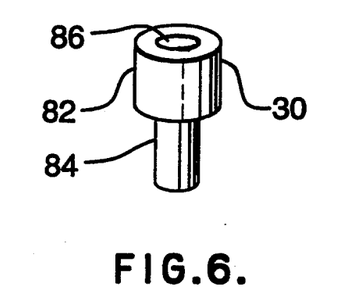
FIG. 6 is a perspective view of a target reflector of the invention of FIG. 1.
Figure 7:
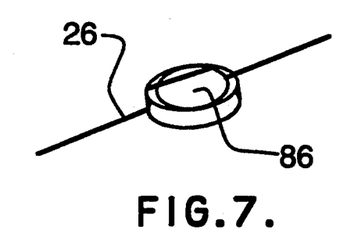
FIG. 7 is a perspective view of the target reflector of FIG. 6 reflecting a laser beam.

Referring to FIGS. 6 and 7, target reflector 30 which is mounted about the surface 28 of layout tool 18 a small machined pin 84 with a small precisely positioned retroreflective target 86, which is a homogeneous field of small beads which reflect the laser light back to its source. It has been found that the retroreflective material used in traffic signs have the required reflective property. However, other retroreflective material are also contemplated within the scope of this invention.

The target reflector 30 is removable but is durable and can withstand high temperatures. Surface 28 is provided with pinholes 31 which frictionally receive pin 84. The precise location of these pinholes 31 relative to the pattern 32 to be projected thereon will be known to the host computer 20.

Each laser projector 12, 14 consists of drive electronics, a laser light source 36, laser intensity control 38 and a high speed mirror deflection system 42, 44. At any instant, the system is projecting only a single spot, however, by tracing the spot over the same projection outline very rapidly, the appearance of a constant image is produced.

The galvanometers in scanners 42 and 44 are scanned through intermediate points at preferably 100 microsecond intervals and a single high resolution step of the scanning mirror produces a shift of less than 0.002 inch on a surface 10 feet from the scanner.

The laser intensity control 38 dynamically adjusts the laser intensity, increasing laser intensity when the laser moves faster to maintain an even intensity line projection while maintaining safe laser light levels when the beam is not scanned. The intensity control 38 also allows instantaneous blanking of the laser beam when multiple segments are displayed.

The projectors 12 and 14 are mounted to the support stand 16 using mounting holes on the top surface of the projector unit. Fine adjustment of the projection angle (15 degrees) within the fixed projection window is possible using the projection angle adjustment screws 50. The 25-pin cable 92 from the printer port of computer enters from the printer cable input connector 54 and is "daisy chained" to the next projector using the output 25 pin connector 56. Cables are keyed to prevent incorrect connection.

The laser system outlines laser target reflector alignment boxes to allow the operator to position the tool in the approximate location previously specified by the operator. The tool should be moved to within a few inches of the specified location.

The main portion of the ply system is activated. The operator may select plys associated with the tool and control basic projection parameters, including stop and start projection and control display rate.

Figure 8:
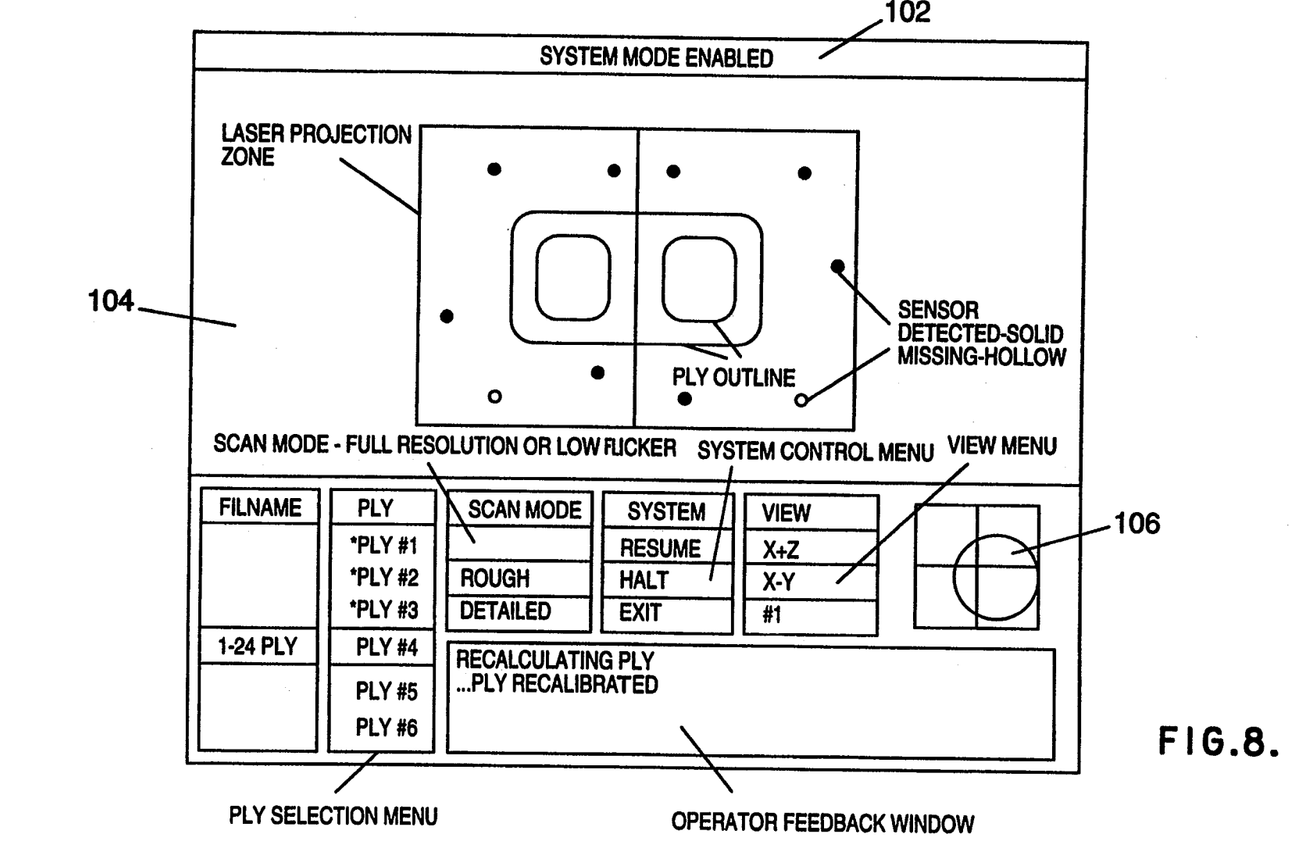
FIG. 8 is a typical computer screen image of the invention of FIG. 1.

The operator interface for the ply projection system is illustrated in FIG. 8. The upper half of the screen displays the currently selected ply and the current system status. The single line status display 102 normally identifies the version number of the software. However, the display will change to indicate a change in system status, for example, when entering system mode. Below the status line, the ply display window 104 shows the boundary of each projector zone, if specified, the condition of calibration target reflectors and the display pattern.

The lower half of the screen provides the operator interface. The file menu is used to select the ply file for the current tool. The ply file selects a specific ply within the file to display. Choice of rough or detailed scan mode selects either a clearly visible low flicker display or an alternate mode that will tradeoff visibility to provide the optimal display accuracy. The system menu allows the operator to return to the password control interface or to resume a previous job. The view menu control the apparent viewpoint used to display the ply data.

A target reflector scan window 106 appears which displays the result of scans for reference target reflectors. A cross hair shows the expected target reflector position with a dot marking the actual measured target reflector location. The target reflector window can be used to check target reflector response and appropriate size of the target reflector grid scan.

The menu system is controlled by using the left and right cursor arrows to switch between menus, the up and down cursor arrows to move between the selections provided in the menu and the ENTER key to choose the currently selected item. If the item is not chosen, it is returned to its default or previous value when the operator leaves the menu. The PAGE UP and PAGE DOWN keys may be used to move through available selections in large steps and the INSERT key can be used to update the file menu if required.

The ply display window 104 provides feedback to the operator concerning the status of the projection system and the appearance of the currently projected ply.

Ply outline 32 is a projection of the 3D boundary of the currently selected polygon provides a graphic view of the projected pattern. The ply may be shown as an orthogonal projection onto the X-Y, X-Z or Y-Z planes or as perspective projections from each camera viewpoint. Parts of the boundary outside all projector ranges are displayed in a different colored outline.

If a projector viewpoint is selected, movement of the laser while blanked or turned off and the projection of the selected projector is differentiated by displaying in cyan to make clipping assignments clear. The maximum extent of the selected projector is displayed in a read (a pin-cushion shape) to visibly display projector extents.

If a projector develops a fault, for example, the projection is out of error tolerance, the affected scanner is halted and the projection outline is shown in a dull red color. A view from an inactive projector cannot be shown and will default to the X-Y projection view if the inactive projector is selected.

If explicit clipping coordinates are specified, the zone of projection for each laser scanner is projected onto the x-y plane and displayed as a green outline. Note that projector zones can overlay and are not necessarily rectangular.

If automatic clipping is used, a projector viewpoint must be selected to determine projector clipping assignments. The segments of the outline covered by the selected projector are emphasized by displaying in a light cyan color. No explicit boundaries are shown. Note that the ply outline can be partitioned into however many segments required for efficient projection.

If the projector cannot physically project over some of its prescribed zone, for example, due to poor placement of the tool, the operator feedback window will indicate the number of ply outline points outside the possible projector range and the physical boundary of the affected laser will be projected onto the x-y plane and displayed as a red Figure, generally appearing as a distorted "pin cushion" shape.

The target reflectors used to calibrate each laser projector are shown in the display window as filled circles if the target reflector has been successfully located or as a hollow circle if the target reflector could not be reliably detected. Note that if too few target reflectors are detected to reliably calibrate the system, an error message will be printed and the projector deactivated.

Figure 10A:
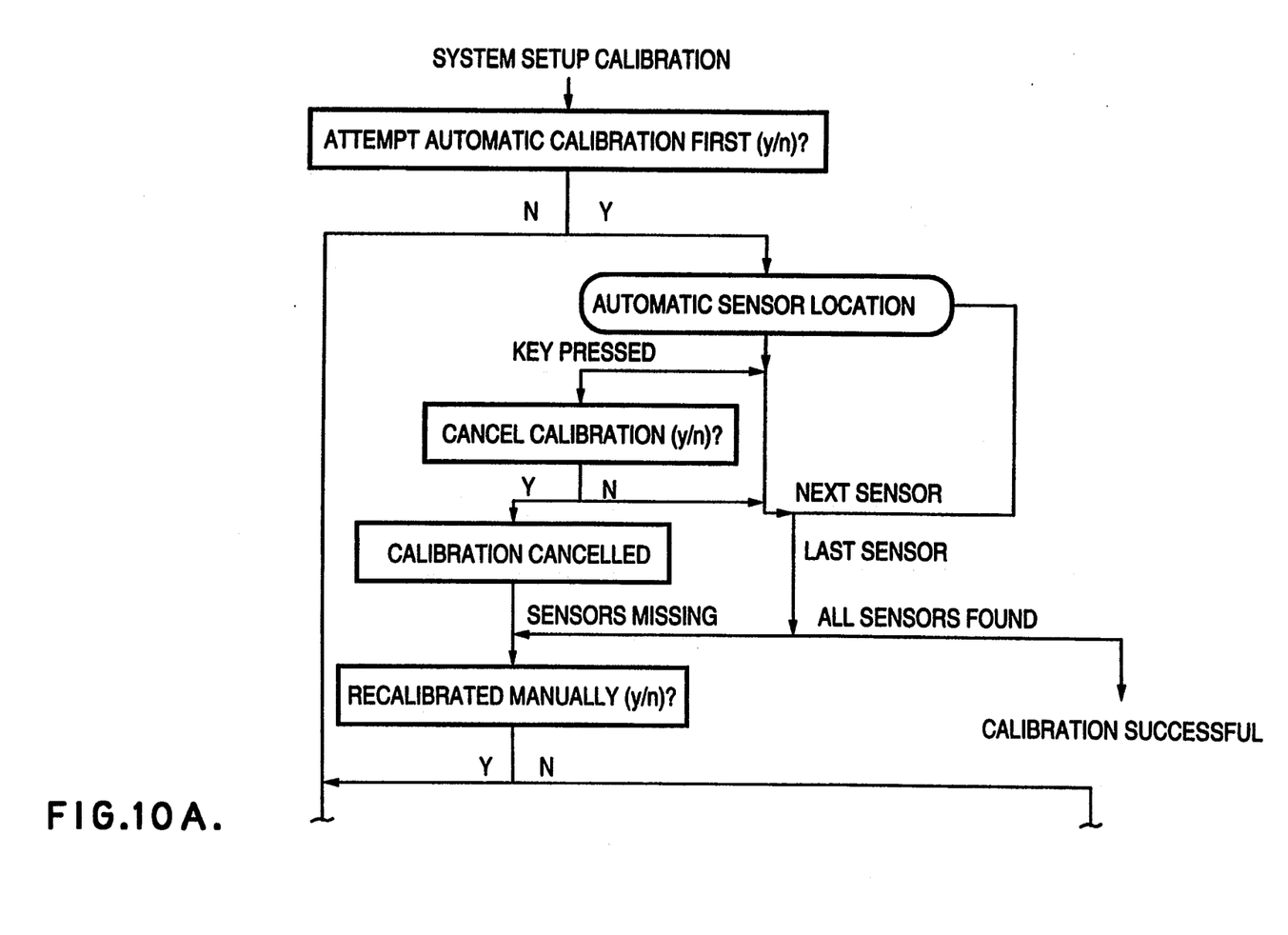
FIG. 10 is a flowchart of the system calibration of the invention of FIG. 1.
Figure 10B:
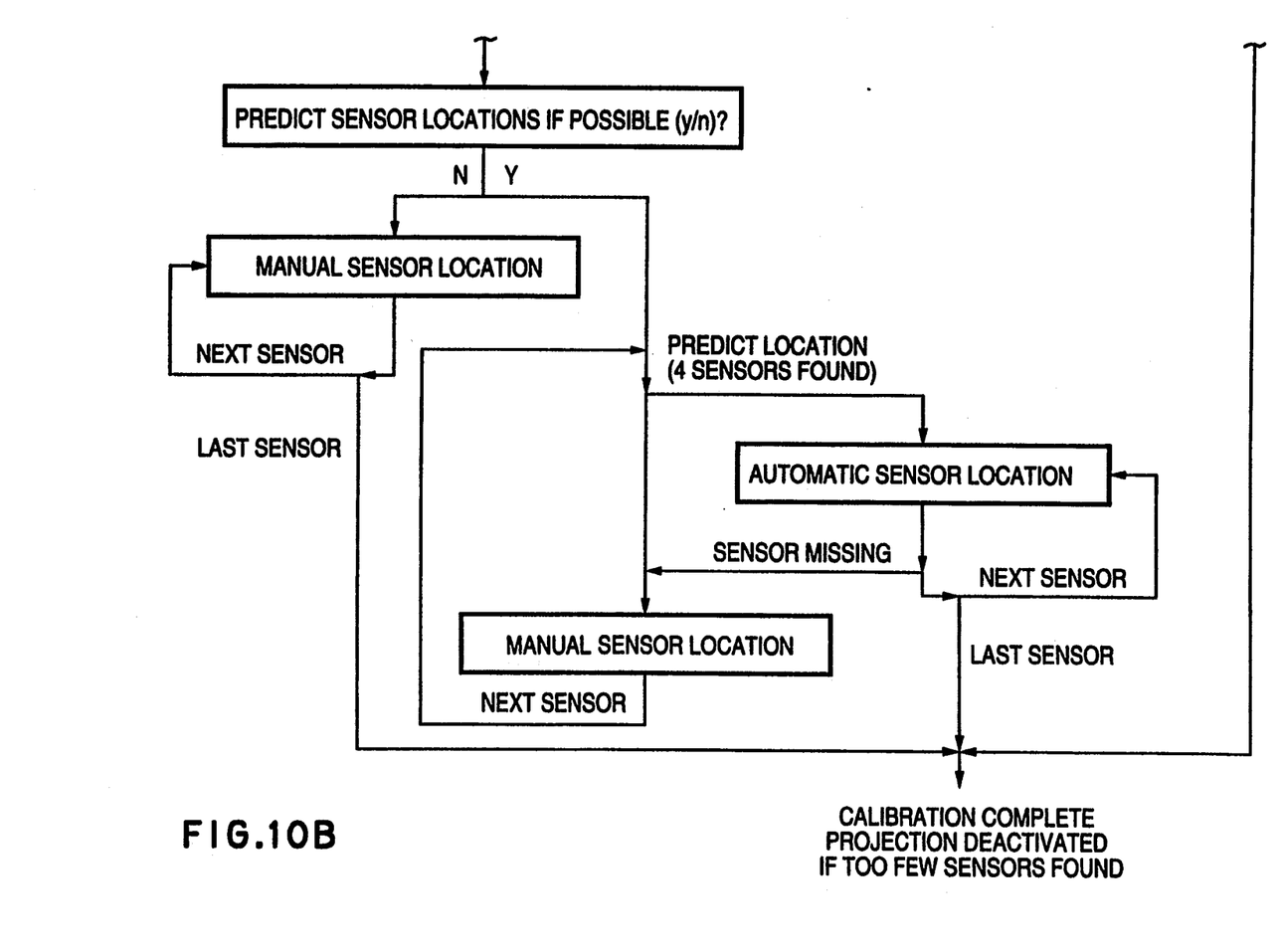

Once a projector has been selected, the system will initially provide the option of locating the target reflectors automatically based on the laser coordinates stored in the tool calibration file. If this option is not selected or if one or more target reflectors are not obtained by the automatic procedure, the system allows the operator to select the starting positions for each target reflector search using the computer mouse. The laser spot will follow the mouse movement. When the laser spot is close to the target reflector (within 2") the LEFT mouse button is pressed to initiate an automatic search for the precise target reflector location. A flow chart is provided in FIG. 10 to provide an outline of the overall procedure.

Figure 11:
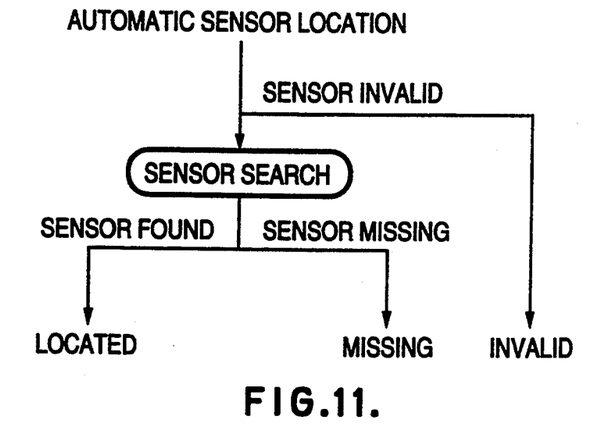
FIG. 11 is a flowchart of the automatic target reflector location of the invention of FIG. 1.

Referring to FIG. 11, the system can be set to predict the expected location of any remaining target reflectors once a sufficient number have been identified by the operator. Usually four target reflectors are required, although more may be required if the first four are redundant, for example, arranged in a line. When the target reflector locations can be predicted, target reflectors will be located automatically. If a target reflector cannot be located, a manual location will be used as a backup procedure.

Note that manual target reflector location allows the operator to mark a target reflector as INVALID, to be ignored by the system or MISSING if a valid target reflector location cannot be obtained. Any target reflector marked INVALID will not be recorded when the tool calibration file is saved. Note that since the system can function with missing target reflectors; target reflector invalidation should only be used when no further use of a target reflector position is expected.

The calibration may be terminated at any time by pressing a confirmation key at the resulting cancellation prompt. If calibration is canceled, all target reflectors will be marked as missing.

If too few target reflectors are located to reliably locate the tool, the projector will be marked as inactive and will be deactivated with the affected laser being blanked and its scanning halted. When automatic clipping is active, other projectors will be reassigned to cover the missing projector data where possible.

Automatic target reflector location proceeds without operator intervention but will ignore any target reflectors earlier marked INVALID by the operator.

Figure 12:
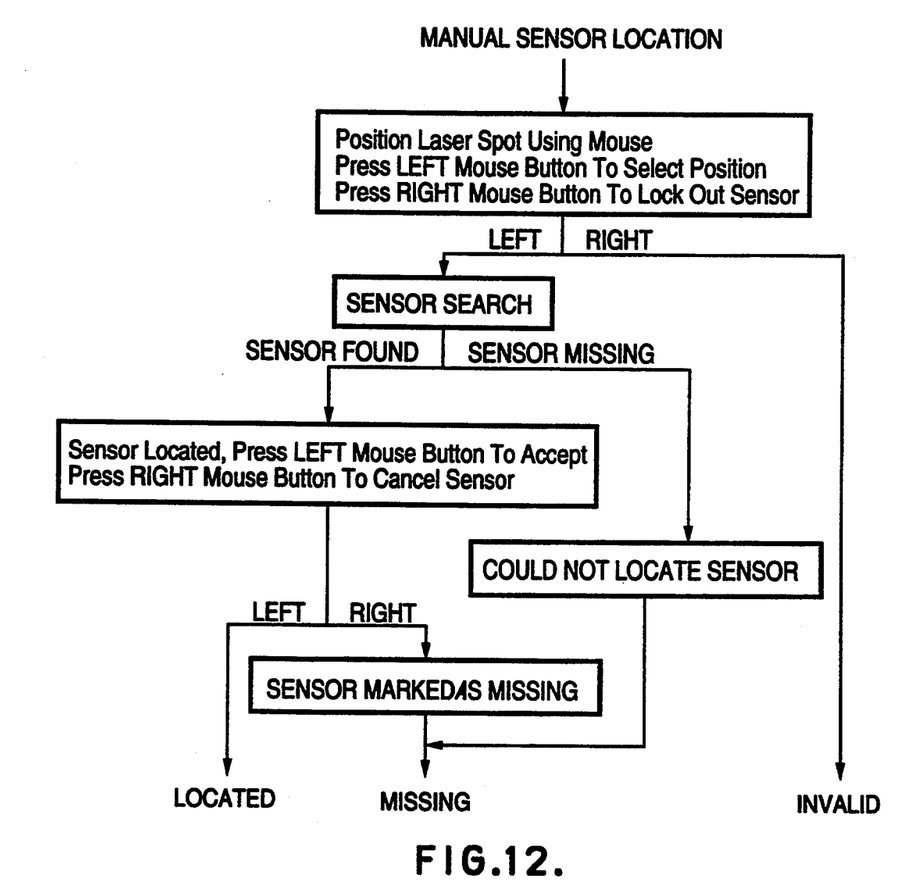
FIG. 12 is a flowchart of the manual target reflector location of the invention of FIG. 1.

Referring to FIG. 12, manual target reflector location requires the operator to first position the laser spot, using the house, close the target reflector position. If the RIGHT mouse button is pressed at this time, the target reflector will be marked INVALID and will be ignored by the projector. A target reflector is marked INVALID when a particular target reflector is beyond the scanning range of the projector or if a target reflector is damaged.

The LEFT mouse button will initiate a target reflector search beginning with an expanding box which quickly locates the rough position of the target reflector, followed by a grid scan to obtain the precise location. Additional scans result if the initial target reflector is not completely contained with the grid. More efficient scanning may result if the original grid is expanded.

If the target reflector is found the operator presses the LEFT mouse button to verify the target reflector selection. The target reflector will be marked as missing if it cannot found or if the RIGHT mouse button is selected. For example, if a target reflector is located but the wrong target reflector is indicated.

Once the reference locations have been established, the system calculates the projector location and evaluates projector characteristics to the level defined by the refine command line parameters. The process terminates either i) when the command line specified error level is attained, ii) when no further improvement is possible or iii) when processing time has been excessive.

In normal operation, laser parameters will be correct and only calculation of shifted tool or projector position will be necessary to reduce error to within the specified tolerance. In this instance, recalculation should require less than a second after locating all target reflector positions. If the desired error level cannot be attained even with projector characteristics evaluation, the most likely cause of error is an incorrectly detected target reflector position or an incorrect 3D coordinate. At least six target reflectors must be located for complete evaluation. Use the manual target reflector detection mode to check the centering of each target reflector.

The status message indicates the calculated laser scanner parameters (y gain, x/y gain ratio, x center position, laser misalignment and galvo axis misalignment). The final position message give the x, y, z coordinate of the projector in tool coordinates.

Figure 13:
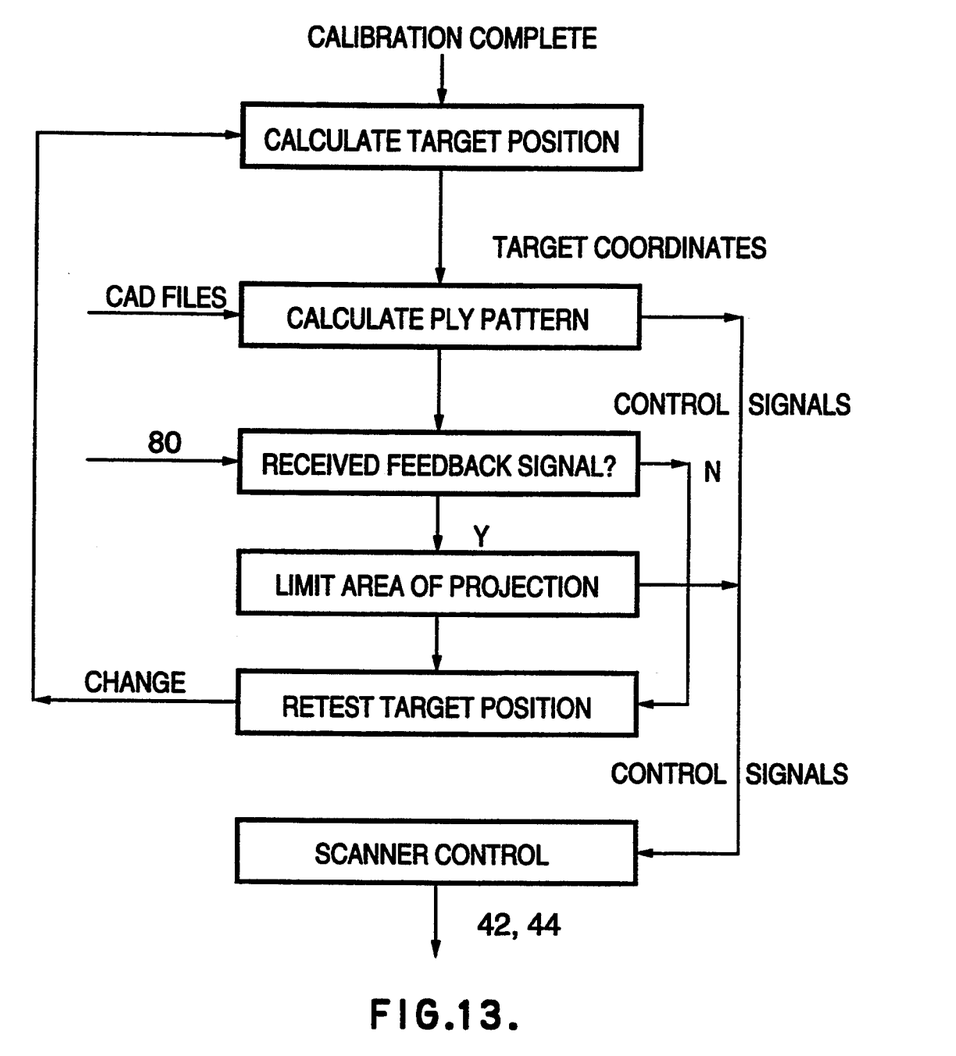
FIG. 13 is a flowchart of the operation logic of the invention of FIG. 1.

Referring to FIG. 13, once the laser projector has located the reference targets 30, an algorithm based on a closed-form inverse perspective transformation precisely calculates the relative 3-dimensional orientation and position of each target reflector relative to the tool coordinate system. Closed-form inverse perspective transformation is a known technique. A description of closed-form inverse perspective transformation is found in Rueb, K, "Hypothesis Refinement for 3D Scene Interpretation", PhD Thesis, University of Waterloo, 1990, the contents of which are hereby incorporated by reference.

Periodic retesting of target reflector positions monitors any change, such as movement of the tool, and automatically corrects the projection if specified limits are exceeded.

If more than four target reflectors are detected by the projector, a numerical approximation algorithm evaluates the physical characteristics of the scanner mechanism itself (e.g. mirror center position, laser misalignment) to provide automatic correction for factors such as component change with temperature drift. At least 6 target reflectors 30 are required for full evaluation.

Finally, all target reflector positions may be continuously tested against a placement tolerance specified in inches on the projection surface. Any deviation from the tolerance will deactivate the projector until the specified tolerance is achieved. The specified set of target reflectors may then be used to continually verify system accuracy during operation. Any number of target reflectors may be specified for each tool, however, a separation of a few inches should be maintained between target reflector locations to avoid confusion between target reflector positions.

Projection to the full resolution of the scanner requires a settling time to allow the mirrors of scanners 42 and 44 to fully adjust to their final position. As a result, if the pattern displayed by a single projector is quite complex, the laser may take an excessive period of time to trace the entire pattern and the projection will appear to flicker severely.

To reduce flicker, a rough projection mode is available that reduces the resolution of the scan to allow a faster display. This display mode is generally used for initial ply alignment when a clear view of the overall outline is essential.

Alternatively, flicker can be reduced by only showing a subset of the available points in the outline. Using this method, the projector projects only certain "focus of attention" areas. Each focus of attention area is a segment of the outline (typically about 1 foot) that is displayed very accurately but with little flicker since only a faction of the complete outline is shown.

The operator identifies a focus of attention by placing a patch of retroreflective material 90 (FIG. 1) which can be attached to a glove or small "puck" in the path of the laser outline. The laser beam will be reflected back to the projector which will reflect off the wedge-shaped lens 68 to the photo sensor 80. Photo sensor 80 will generate a feedback signal to the host computer 20. The host computer will automatically reduce the image projected to an area around the point where the feedback signal was received. Since a smaller area is projected, the flicker is reduced. The reduced image will continue provided the feedback signal is received.

The highlighted focus of attention follows the operator's movements as the puck or glove is moved. Any number of focus of attention zones may be defined in this manner, although an excessively large number of zones will once again result in an increased amount of flicker.

Figure 9:
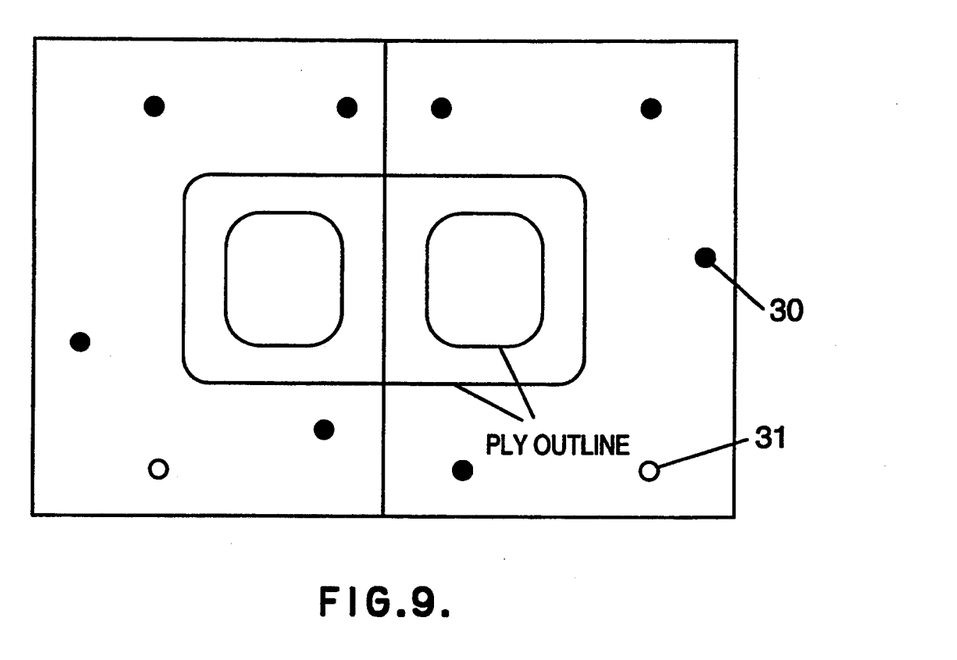
FIG. 9 is a typical ply display window of the screen image of FIG. 8.

For systems consisting of more than one projector as illustrated in FIG. 1, each projector in the system must be assigned a region of projection. This may be done explicitly by specifying a boundary in tool coordinates for each projector or by allowing the system to automatically allocate the projection zones. FIG. 9 illustrates a graphical representation generated by the host computer 20 of the projection zones.

Explicit projection zones are specified by boundaries defined in the X-Y plane of the tool coordinate system. With this method, projection zones for each projector are fixed and do not change when tool or projector positions shift. Fixed boundaries are defined in a tool calibration file.

If explicit projection zones are not defined, the system will automatically assign projectors to portions of the ply data. If surface normal vectors are provided in the ply data, the system selects projectors to provide the best angle of incidence to the surface (closest to the normal vector). If normal vectors are not provided, the system assigns ply data to the closest projector available.

The system will adapt to changes in tool or projector positions or system status, changing projector assignments as appropriate. For example, if a projector becomes unusable, the system will compensate as much as possible with other projectors, as well as redistributing projection task if additional projectors become available. As a result, the projection task and data files essentially become independent of the actual physical configuration of scanners and the chosen tool position.

While the invention herein has been described in connection with exemplary embodiments, it will be understood that many modifications will be apparent to those skilled in the art.

We claim:

1. A laser projection system comprising
   a laser projector operably connectable to a computer means for controlling the operation of said system, said laser projector comprising
   a laser beam source for generating a laser light beam,
   a collimator comprising a focusing lens for focusing said laser light beam to a focal point, a collimating lens for collimating said laser light beam beyond said focal point and a wedge-shaped lens interposed between the focusing lens and collimating lens, said wedge-shaped lens having an aperture for passing said laser light beam therethrough,
   two scanners for directing said light beam about a light path, and
   a photo sensor means for receiving light and generating a feedback signal, said photo sensor means mounted to receive light refracted by said wedge-shaped lens, and
   a plurality of target reflectors, each having a retroreflective material for retroreflecting a light back to its source,
   wherein said laser light beam is projectable in a predetermined pattern and if the laser light beam is retroreflected back to the laser light source, the retroreflected laser light beam is refracted by said wedge-shaped lens towards said photo sensor for generating a feedback signal for said computer means.

2. A laser projection system as claimed in claim 1 wherein said plurality of target reflectors comprises a plurality of mountable targets removably mountable on a surface and upon striking said mountable targets with said laser beam, said photo sensor generates a feedback signal for each of said mountable targets for establishing spatial coordinates of said mountable targets.

3. A laser projection system as claimed in claim 2 wherein said plurality of target reflectors further comprises a moveable target for inserting in said light path of said laser beam while projecting an image onto a surface and upon striking said moveable target with said laser beam, said photo sensor generates a feedback signal for projecting only a portion of the image.

4. A laser projection system as claimed in claim 3 wherein said wedge-shaped lens has a face angle of between 5° and 45°.

5. A laser projection system as claimed in claim 3 wherein said wedge-shaped lens has a face angle of 10°.

6. A method of producing a feedback signal, comprising the steps of
   generating a laser light beam from a laser light beam source,
   collimating said laser light beam,
   directing said laser light beam towards an object, reflecting said laser light beam onto a return path towards the laser light source, refracting said laser light beam on said return path towards a photo sensor, said photo sensor responsive to said laser light beam for generating a feedback signal.

7. A method as claimed in claim 6 wherein said collimating comprises directing said laser light beam through an aperture of a wedge-shaped lens and said wedge-shaped lens refracts said laser light beam.

8. A method as claimed in claim 7 wherein said wedge-shaped lens has a face angle of between 5° and 45°.

9. A method as claimed in claim 7 wherein said wedge-shaped lens has a face angle of 10°.

* * * * *